US008212873B2

(12) United States Patent  (10) Patent No.: US 8,212,873 B2
Corley  (45) Date of Patent: Jul. 3, 2012

(54) SECURITY CAMERA IMAGE CORRECTION SYSTEM AND METHOD

(76) Inventor: Ferrand D. E. Corley, Mississauga (CA)

( * ) Notice: Subject to any disclaimer, the term of this patent is extended or adjusted under 35 U.S.C. 154(b) by 1520 days.

(21) Appl. No.: 11/705,470

(22) Filed: Feb. 13, 2007

(65) Prior Publication Data

US 2008/0192120 A1  Aug. 14, 2008

Related U.S. Application Data

(60) Provisional application No. 60/772,901, filed on Feb. 14, 2006.

(51) Int. Cl.
 *H04N 7/18* (2006.01)
(52) U.S. Cl. ........................................................ 348/143
(58) Field of Classification Search ........................ None
 See application file for complete search history.

(56) References Cited

U.S. PATENT DOCUMENTS

| | | | | |
|---|---|---|---|---|
| 6,757,010 | B2 * | 6/2004 | Fasciano | 348/177 |
| 6,853,936 | B1 * | 2/2005 | Kelliher et al. | 702/94 |
| 2003/0081118 | A1 * | 5/2003 | Cirulli et al. | 348/104 |
| 2006/0050264 | A1 * | 3/2006 | Jung et al. | 356/73 |
| 2008/0068444 | A1 * | 3/2008 | Thielman et al. | 348/14.1 |
| 2009/0021580 | A1 * | 1/2009 | Ishigami et al. | 348/142 |

* cited by examiner

*Primary Examiner* — Moustafa M Meky
*Assistant Examiner* — Clayton R Williams

(57) ABSTRACT

A security camera and an image, within the camera's field of view, of a test pattern, containing color elements and gray-scale elements having know predetermined spectrophotometrical values and resolution elements. After taking of images at a scene, and when subsequently reproduced accurately the elements will produce electronic signals that are detectable on measuring equipment well-known to the trade, such as vectorscopes and waveform monitors. Adjustments and corrections can then be made to the images of a scene, based on those readings. A method of adjusting and correcting images using the test pattern is also disclosed.

4 Claims, 3 Drawing Sheets

SECURITY CAMERA IMAGE CORRECTION SYSTEM AND METHOD

This application claims the benefit of U.S. Provisional Application No 60/772,901 Filed Feb. 14, 2006, entitled Security Camera Image Correction System and Method. A system and method that enables images previously recorded by cameras used in security, law-enforcement, medicine and other disciplines, to be subsequently standardized for image quality to enhance accuracy of reproduction.

FIELD OF THE INVENTION

Background of the Invention

While methods of controlling image quality are well-established in television and motion pictures, the requirements of these industries differ significantly to those of law-enforcement and security.

In the entertainment world, the emphasis is on image consistency, and attractive appearance and not on accuracy of reproduction. In reality, the broadcasting and motion picture industries go out of their way to produce images that are larger than life, because viewers prefer brighter, more colorful images.

In security and real-life image reproduction, the need is not to produce attractive pictures, but accurate reproduction of a scene or person. This is the challenge that this invention is designed to address.

While these fundamental differences exist in the requirements for recording of images produced for entertainment, compared with the subsequent enhancement of images already recorded in security and other real-life applications, there are two areas of similarity.

Image quality can be controlled either by:
Adjusting a camera's taking characteristics prior to its assignment to a production or location, or
Correcting the recorded images produced by the camera, in a subsequent operation In entertainment—camera adjustment, typically happens under controlled, often laboratory conditions where the type of lighting, spectral distribution of the light source and brightness are carefully controlled.

Because such cameras have been well adjusted in the laboratory and the lighting on the set is similar to that used in the laboratory, further or subsequent adjustment of a recorded image is often not required.

In security and real-life situations—camera adjustment is limited. Cameras used in these applications are relatively inexpensive and invariably have little or no image adjustment capability. Often, the only control is to test different makes and models of cameras, and to select those which are best suited for the task or location in which they will be used.

Because camera adjustment is so limited, subsequent correction of recorded images becomes the only option. However, this is difficult for three reasons.
1) The cameras and lenses are relatively inexpensive, consequently produce poorer quality images.
2) Achieving accurate reproduction is more difficult than producing pleasing looking pictures.
3) Lighting of the scenes being photographed is uncontrolled, inconsistent, and will vary widely at different times of day, or night, and will typically be of poor spectral quality.
The System.

To overcome these issues, this invention proposes to install within the camera's field of view a test pattern. The test pattern may include precision colours, and spectrophotometrically neutral grayscale and resolution information. When reproduced accurately the colors and grayscales of the test pattern will produce electronic signals at prescribed locations on measuring equipment well-known to the trade, such as vectorscopes and waveform monitors.
Image Correction.

When viewed on standard monitoring equipment, the images produced by the typical cameras in question, invariably exhibit inaccurate color and grayscale reproduction. However, using one of a number of imaging software packages well-known to the trade, the color and grayscale information of the recorded images can be adjusted for accurate reproduction by reference to the recorded image of the test pattern, taken at the same time and place. Because the test pattern is illuminated by the same light source as the rest of the scene, adjusting the test pattern for accurate reproduction automatically corrects the total scene.

Because test patterns change with age the preferred embodiment would include a recommended replacement date within the active area of the pattern.

In another embodiment the significant test pattern information would be disguised in graphics such as public service announcements or even commercial advertisements. Typical Installation locations would include airports, banks, public buildings, highways, hospital operating rooms, vehicles such as taxicabs, aircraft, buses and subways, retail stores, intersections, ad casinos and in fact anywhere security or accurate image reproduction are important.

The various features of novelty which characterize the invention are pointed out with more particularity in the claims annexed to and forming a part of this disclosure.

For a better understanding of the invention, its operating advantages and specific objectives attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
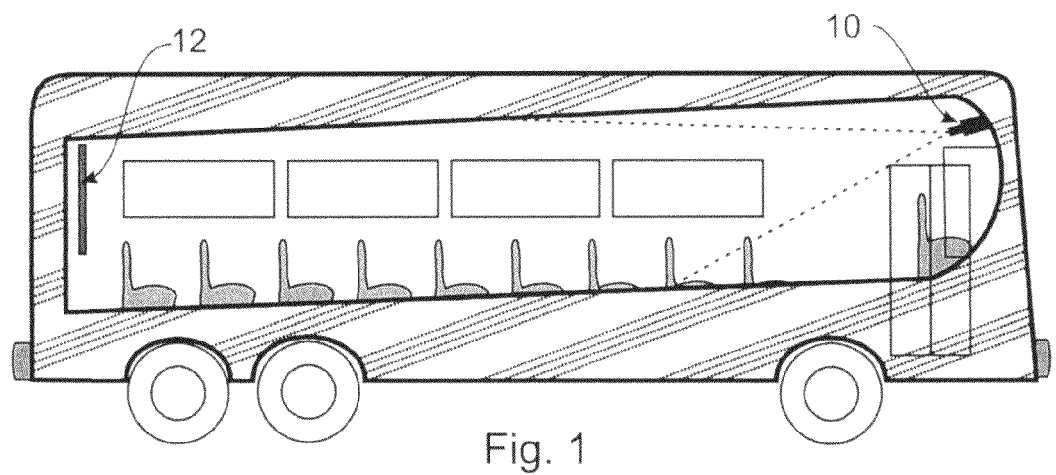
FIG. 1 is a schematic side view of a passenger vehicle such as a bus, showing the installation of a system illustrating the invention, with a camera at one end of the vehicle and a test pattern at the other.

As shown in FIG. 1 the invention is illustrated there as being installed in a bus or coach vehicle. It might, however, represent installations in a wide variety of locations, such as automobiles, cabs, trains, subways, airports, public spaces, platforms, aircraft, ships, hospitals, schools, highways, intersections and of course retail stores and commercial and office buildings, and in casinos.

Conceivably the system would find use in home security systems as well. Outdoor locations are not to be excluded, where such a system finds utility.

The security system consists of a camera (10) which is a typical security camera taking, usually video pictures, or in some cases a series of stills, of the space to be surveyed.

Cameras of this type are well known, and are of great variety. They may be provided with re-writable active memory (RAM), or image storage in the form of a continuous roll of video tape, or a digital disc, or may be connected to a larger system in which the pictures are recorded at a remote location.

Typically they will be focussed so as to record events and persons anywhere within the space. In larger spaces such cameras may be swung to and fro by remote control. In other cases there may be multiple cameras all taking pictures at the same time or one after the other.

The illustration of the one fixed camera is purely illustrative and is deemed to include any and all such installations.

A test pattern (12) is shown mounted in a suitable location, within the field of view of the camera. In this case it is at the end of the bus.

If the camera was of the moveable type, swinging to and fro across a wider arc, then there may be several such test patterns, located at spaced apart locations.

Figure 2:
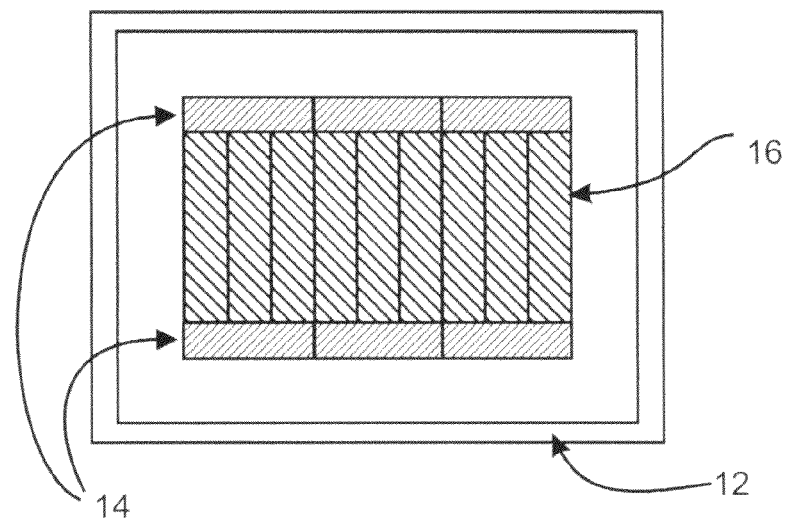
FIG. 2 is an elevation of the test pattern.
Figure 3:
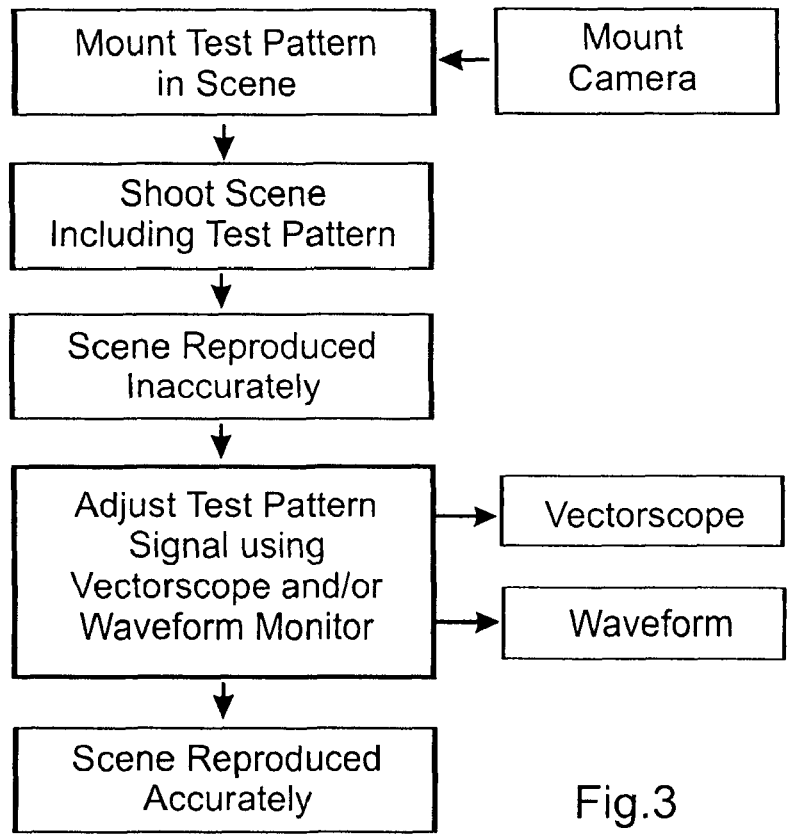
FIG. 3 is a schematic block diagram of the method of viewing and enhancing images already recorded on a camera.
Figures 4A, 4B:
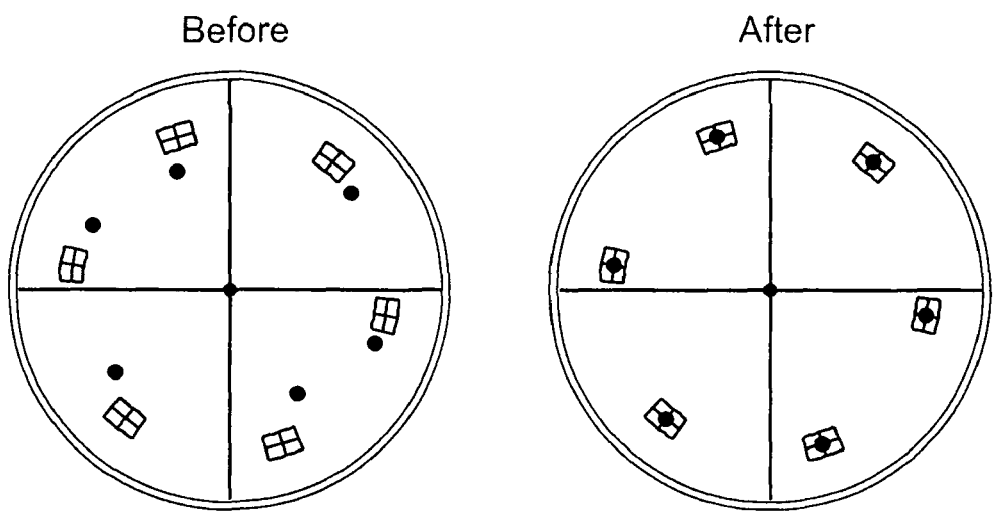
FIGS. 4a and 4b are schematic diagrams showing the use of a vectorscope, in correcting the colour and grayscale reproduction of a previously recorded image containing a test pattern, (FIG. 4a before), by electronically moving the signals from the test pattern into their respective vectorscope boxes, (FIG. 4b after)

The test pattern (12) consists of a series of test elements (14) and (16), (FIG. 2). These elements are formed with predetermined reference values.

Some elements (14) are "colour reference" elements. Other elements (16) are "grayscale reference" elements.

The colour elements (14) are based on the colour characteristics of the video or other system and they represent the hues of the primary and secondary colours.

The values of the colours for an NTSC system based on a 2° observer at illuminant D65 are: Red=X32.1, Y23.2, Z15.1,—Green=X29.5, Y47.3, Z19.9—Blue=X21.0, Y16.5, Z59.7—Cyan=X38.2, Y50.7, Z65.4—Magenta=X40.8, Y26.7, Z60.6—Yellow=X49.3, Y57.5, Z20.8. Tolerance values are based on the electronic reproduction of the pattern and are ±10 mV.

Other useful colours such as skin tones may also be included with the colour elements (14).

The grayscale elements (16) are designed to be spectrophotometrically neutral, reflecting red, green and blue light essentially equally, but at different brightness levels. The reflectance values for a seven step grayscale are: step 1=90%—step 2=63.6%—step 3=42.2%—step 4=25.5%—step 5=13.2%—step 6=5.2%—step 7=1.0%. Tolerance varies from ±4% of step aim value at step 1 to 10% of step aim value at step 7.

The reflectivity of the grayscale elements (16) will vary from one grayscale step or element to the next increasing in density from white to black white.

The camera will record the test pattern (12) any time the camera is recording the scene, in this case in the bus. Thus both any activity in the site, in the view field of the camera, will be recorded by the camera, and at the same time the test pattern will also be recorded.

The scene may vary widely in clarity, ambient lighting and so on, resulting in inaccuracies when the images are reproduced later.

The persons or events in the images may also vary widely in definition, pigmentation, clothing and the like.

Since the test pattern has also been recorded at the same time and place, it becomes possible to use the test pattern images to adjust the characteristics of the images of said scene, in the following manner.

Method of Operation.

When viewing images of the scene taken by the camera, the image of the test pattern (12) enables corrections and adjustments to be made to optimise the quality of the image of the scene.

When reproduction is inaccurate, as it will be in most cases, then adjustment is required, to render the reproduction of the test pattern more accurate.

When these adjustments are made, the image of the test pattern is reproduced accurately. The color and grayscale elements will produce electronic signals that fall at prescribed locations on measuring equipment well-known to the trade, such as vectorscopes and waveform monitors. This therefore results in appropriate adjustment in the images of the scene.

A vectorscope used in video, displays Hue and colour Saturation information. A black and white signal from a camera, having no colour information produces a dot in the centre of the screen. The Hue component (red, green, blue etc) is defined by the angle of the signal from the centre. Relative to a clock face Red is approximately 11.30, Magenta about 1.30, Blue about 3.30, Green about 5.30, Cyan 7.00 and Yellow 9.30. As colour saturation increases, the signal moves out from the centre of the screen, maximum colour saturation moves the signal to the edge of the screen. Of the three components of a colour, Hue, Saturation and Brightness, a vectorscope displays only Hue and Saturation; Brightness must be viewed on a Waveform monitor capable of individually displaying the brightness of the Red, Green and Blue components of a colour.

Before measuring pre-recorded or other video signals, a vectorscope's calibration is checked using a precise electronically generated signal with standard colour saturation amplitude of 75%. While looking at the electronic signal on the vectorscope screen, the variable gain (amplification) control on the vectorscope is adjusted to position the Red, Green, Blue, Cyan, Magenta and Yellow signals in their respective boxes in the vectorscope graticule.

The pre-recorded test pattern image of the colour and grayscale areas shot with the camera is played back through a computer, or other equipment capable of modifying the colour and tonal characteristics of the signal, while the image is viewed on a picture monitor and the electronic signals are displayed on the vectorscope and/or waveform monitor.

Because colours equivalent to the 75% electronic colour bar colours are seldom seen in real life, the saturation levels used in the test pattern colour elements are 50% lower than the 75% electronic colour bar colours, ±1%, at levels more representative of real life images. Colours at this level of saturation will fall half way between the centre white point of the vectorscope display and the 75% boxes for the respective colours. Adjusting the variable gain on a vectorscope by a factor of X2 will, on a camera that is reproducing colour accurately, place the test pattern colour elements in their respective boxes.

For cameras that have not reproduced colours accurately, a computer, or other equipment capable of modifying the colour and tonal characteristics of the signal, is used to modify the colour characteristics to position the test pattern colour elements in their respective boxes. These colour correction settings may then be used to correct other images photographed using the same camera under similar lighting and exposure conditions, but without the test pattern being in the scene.

Because vectorscopes only provide Hue and Saturation information, Brightness, the third and, an important component of colour, is omitted. The present system addresses this issue by incorporating specific Red, Green and Blue brightness level combinations of 551.25 mV and 288.75 mV±2.5% into each of the Red, Green, Blue, Cyan, Magenta and Yellow primary colour elements of the test pattern.

Figure 5:
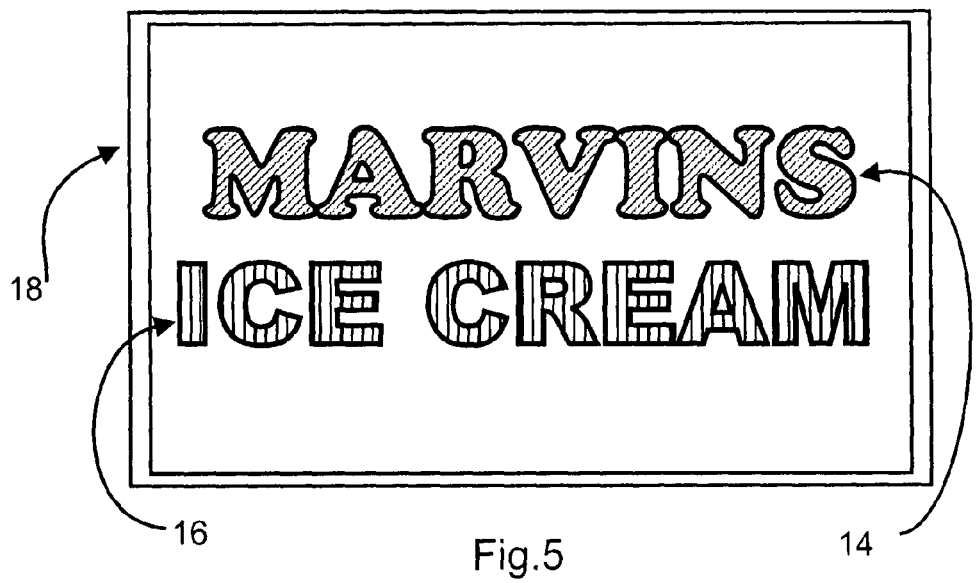
FIG. 5 is a schemaic illustration of advertising image incorporating a test pattern.

For example, the R,G,B voltage levels produced by the Red colour element are Red 551.25 mV, Green 288.75 mV and Blue 288.75 mV, the Cyan colour element produces levels of Red 288.75 mV, Green 551.25 mV and Blue 551.25 mV, other colour elements reproduce at similar combinations. This enables not only the Hue and Saturation, but also the Brightness component of colour images containing the test pattern to be corrected, or adjusted for a particular colour bias, using a voltage measuring device such as a three channel waveform monitor Because the test pattern is illuminated by the same light source as the rest of the scene, other elements within the scene will then also be reproduced accurately. Because test patterns change with age the preferred embodiment would include a recommended replacement date within the active area of the test pattern. In another embodiment the significant test pattern information, such as precision grayscales and color elements and resolution information, would be disguised in graphics such as public service announcements or even commercial advertisements. An example of such a combination, essentially concealing the test pattern (14) within a advertisement (18) as shown in FIG. 5.

Figure 6:
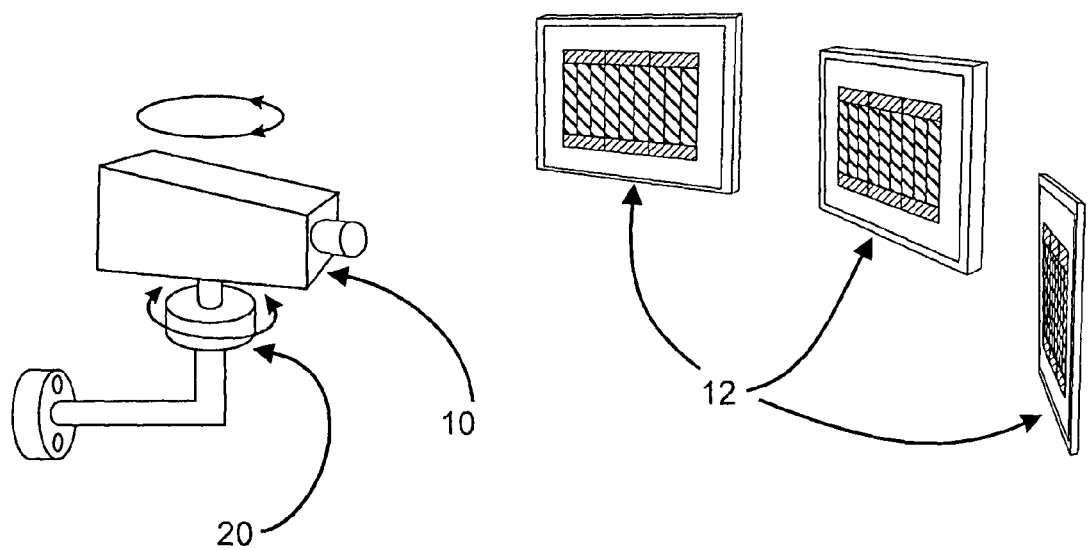
FIG. 6 is a schematic diagram showing the use of a moveable camera and several test patterns.

It will be self evident that the system can also be applied to a moveable camera, as shown in FIG. 6. These cameras typically move from one position to another in a series of steps.

By locating test patterns in the filed of the camera at each of the step positions, any images recorded at any of the steps, will also contain images of the test pattern.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method of recording security images at a site, and, at a time subsequent to the recording of the security images, enhancing the security images for accuracy of reproduction and comprising the steps of:
   positioning a security camera at said site, with a predetermined field of view;
   positioning a test pattern containing precision color elements having known predetermined spectrophotometrical values, and having spectrophotometrically neutral grayscale elements, within said field of view of said security camera at said site;
   recording a scene at said site including said test pattern within said security camera's field of view;
   at a time subsequent to the recording of said images, viewing said recorded images through a system capable of adjusting image colour characteristics of said images, said system having at least a vectorscope for displaying colour hue and saturation characteristics of said test pattern; and
   adjusting image colour characteristics of said images to position at least Red, Green, and Blue primary colour areas in corresponding areas in the vectorscope display.

2. The method as claimed in claim 1 wherein said primary colours further include Cyan, Magenta and Yellow.

3. The method as claimed in claim 2 and further including the step of adjusting image grayscale values thereby correcting said values in said images of said scene.

4. The method as claimed in claim 2, wherein said security camera is moveable between at least two view stations, and including a said test pattern in the field of view of said security camera at each said station, and recording scenes at said stations of said site, and simultaneously recording images of said test pattern at said respective station, and thereafter at a time subsequent to the recording of said images, adjusting said images as aforesaid.

* * * * *